(12) United States Patent
Walsh et al.

(10) Patent No.: US 11,498,282 B1
(45) Date of Patent: Nov. 15, 2022

(54) COMPUTATIONALLY OPTIMIZED AND MANUFACTURED ACOUSTIC METAMATERIALS

(71) Applicants: National Technology & Engineering Solutions of Sandia, LLC, Albuquerque, NM (US); Wilkins Aquino, Durham, NC (US)

(72) Inventors: Timothy F. Walsh, West Lafayette, IN (US); Nekoda van de Werken, Albuquerque, NM (US); Chris Hammetter, Albuquerque, NM (US); Michael B. Sinclair, Albuquerque, NM (US); Harlan James Brown-Shaklee, Albuquerque, NM (US); Joseph E. Bishop, Albuquerque, NM (US); Wilkins Aquino, Durham, NC (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 352 days.

(21) Appl. No.: 16/206,740

(22) Filed: Nov. 30, 2018

(51) Int. Cl.
*B29C 64/00* (2017.01)
*B29C 64/393* (2017.01)
(Continued)

(52) U.S. Cl.
CPC ............ *B29C 64/393* (2017.08); *B29C 64/00* (2017.08); *B29C 64/10* (2017.08); *B29C 64/112* (2017.08);
(Continued)

(58) Field of Classification Search
CPC .............................. B29C 64/393; B33Y 10/00
See application file for complete search history.

(56) References Cited

U.S. PATENT DOCUMENTS 10,040,239 B2 * 8/2018 Brown, Jr. ............ B29C 64/135
10,065,367 B2 * 9/2018 Brown, Jr. ............. B33Y 30/00
(Continued)

OTHER PUBLICATIONS

Deymier, P.A. ed., 2013. Acoustic metamaterials and phononic crystals (vol. 173). Springer Science & Business Media. CH1 (Year: 2013).*

(Continued)

*Primary Examiner* — Nicholas R Krasnow
(74) *Attorney, Agent, or Firm* — Yee & Associates, LLC (57) ABSTRACT

A method, system, and apparatus for fabricating an acoustic metamaterial is provided. In an embodiment, a method for fabricating an acoustic metamaterial includes determining at least one tuned physical property for each of a plurality of micro-resonators according to a desired acoustic property of the acoustic metamaterial. For a particular physical property, a value of the tuned physical property for at least one of the plurality of micro-resonators is different from a value of the tuned physical property for at least one other of the plurality of micro-resonators. The method also includes additively forming the acoustic metamaterial such that the acoustic metamaterial comprises a first structure and the plurality of micro-resonators embedded within the first structure. Forming the acoustic metamaterial is performed such that an actual physical property of each of the plurality of micro-resonators is equal to a corresponding tuned physical property for each of the plurality of micro-resonators.

20 Claims, 8 Drawing Sheets

(51) Int. Cl.
| | |
|---|---|
| *B33Y 10/00* | (2015.01) |
| *B33Y 30/00* | (2015.01) |
| *B33Y 50/02* | (2015.01) |
| *B33Y 70/00* | (2020.01) |
| *B29C 64/112* | (2017.01) |
| *B29C 64/20* | (2017.01) |
| *G10K 11/172* | (2006.01) |
| *G10K 11/162* | (2006.01) |
| *B33Y 80/00* | (2015.01) |
| *B33Y 99/00* | (2015.01) |
| *B29C 64/205* | (2017.01) |
| *B29C 64/30* | (2017.01) |
| *B33Y 40/10* | (2020.01) |
| *B29C 64/182* | (2017.01) |
| *B33Y 40/00* | (2020.01) |
| *B29C 64/176* | (2017.01) |
| *B33Y 40/20* | (2020.01) |
| *B29C 64/227* | (2017.01) |
| *B29C 64/25* | (2017.01) |
| *B29C 64/40* | (2017.01) |
| *B29C 64/10* | (2017.01) |
| *B29C 64/255* | (2017.01) |
| *B29C 64/307* | (2017.01) |
| *B33Y 50/00* | (2015.01) |
| *B29C 64/245* | (2017.01) |
| *B29K 505/08* | (2006.01) |
| *B29K 55/02* | (2006.01) |

(52) U.S. Cl.
CPC .......... *B29C 64/176* (2017.08); *B29C 64/182* (2017.08); *B29C 64/20* (2017.08); *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/40* (2017.08); *B33Y 10/00* (2014.12); *B33Y 30/00* (2014.12); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 80/00* (2014.12); *B33Y 99/00* (2014.12); *G10K 11/162* (2013.01); *G10K 11/172* (2013.01); *B29K 2055/02* (2013.01); *B29K 2505/08* (2013.01)

(56) References Cited

U.S. PATENT DOCUMENTS

| | | | | |
|---|---|---|---|---|
| 2005/0004628 | A1* | 1/2005 | Goetz | A61N 1/36146 607/60 |
| 2007/0164115 | A1* | 7/2007 | Joseph | G06K 7/10722 235/462.21 |
| 2008/0294402 | A1* | 11/2008 | Moroni | G06F 30/23 703/9 |
| 2009/0098027 | A1* | 4/2009 | Tabata | B01F 11/0266 422/128 |
| 2011/0174035 | A1* | 7/2011 | Ghiran | B21D 7/024 72/18.2 |
| 2012/0229474 | A1* | 9/2012 | Foy | G06T 13/20 345/473 |
| 2014/0027199 | A1* | 1/2014 | Claeys | G10K 11/002 181/290 |
| 2015/0047923 | A1* | 2/2015 | Chang | H03H 9/25 181/286 |
| 2016/0271870 | A1* | 9/2016 | Brown, Jr. | B29C 64/153 |
| 2016/0271875 | A1* | 9/2016 | Brown, Jr. | B29C 64/153 |
| 2016/0289468 | A1* | 10/2016 | Turner | B33Y 10/00 |
| 2017/0291370 | A1* | 10/2017 | Burlatsky | G06F 30/17 |
| 2019/0179288 | A1* | 6/2019 | Wike | G05B 19/4099 |
| 2021/0065671 | A1* | 3/2021 | Amano | B29C 64/10 |

OTHER PUBLICATIONS

Pai, P.F., Peng, H. and Jiang, S., 2014. Acoustic metamaterial beams based on multi-frequency vibration absorbers. International Journal of Mechanical Sciences, 79, pp. 195-205. (Year: 2014).*

Cveticanin, L. and Cveticanin, D., 2017. Application of the Acoustic Metamaterial in Engineering: An Overview. Romanian Journal of Mechanics, 2(1), pp. 29-36. (Year: 2017).*

Banerjee, B. et al., "Large Scale Parameter Estimation Problems in Frequency-domain Elastodynamics Using an Error in Constitutive Equation Functional," Comput. Methods Appl. Mech. Engrg., vol. 253 (2013), pp. 60-72.

Liu, Z. et al., "Locally Resonant Sonic Materials," Science, vol. 289 (2000), pp. 1734-1736.

Yu, N. et al., "Light Propagation with Phase Discontinuities: Generalized Laws of Reflection and Refraction," Science, vol. 334 (2011), pp. 333-337.

Matlack , K.H. et al., "Composite 3D-printed Meta-Structures for Low Frequency and Broadband Vibration Absorption," Proc. Natl. Acad. Sci., vol. 113, No. 30 (2016), pp. 8386-8390.

Reichl, K.K. et al., "Lumped Mass Model of a 1D Metastructure for Vibration Suppression with No Additional Mass," Journal of Sound and Vibration, vol. 403 (2017), pp. 75-89.

Reichl, K.K., Inman D.J. "Constant Mass Metastructure with Vibration Absorbers of Linearly Varying Natural Frequencies". In: Mains M., Blough J. (eds) Topics in Modal Analysis & Testing, vol. 10 (2017). Conference Proceedings of the Society for Experimental Mechanics Series. Springer, Cham, pp. 153-158.

Lu, L. et al., "Topology Optimization of Acoustic Metamaterials with Negative Mass Density Using a Level Set-based Method," Mechanical Engineering Journal, vol. 1 , No. 4 (2014), pp. 1-18.

* cited by examiner

COMPUTATIONALLY OPTIMIZED AND MANUFACTURED ACOUSTIC METAMATERIALS

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

CROSS-REFERENCE TO RELATED APPLICATIONS

This application is related to the patent application entitled "ADDITIVELY MANUFACTURED LOCALLY RESONANT INTERPENETRATING LATTICE STRUCTURE", Ser. No. 16/206,722, filed Nov. 30, 2018 and assigned to the same assignee. Each of the aforementioned applications is incorporated herein by reference in its entirety.

BACKGROUND

1. Field

The disclosure relates generally to acoustic metamaterials and, more specifically, to a methodology for optimization and fabrication of acoustic metamaterials.

2. Description of the Related Art

Acoustic metamaterials are multiphase composite materials designed to produce dynamic material properties not found in nature, individual materials, or in traditional composite materials. With appropriate design, acoustic metamaterials may have an effective negative dynamic modulus, an effective negative dynamic density, an effective negative refractive index, and/or an effective imaginary speed of sound. Selection of appropriate properties for the metamaterial may provide for acoustic wave bending, acoustic wave steering, and acoustic wave focusing. However, currently, acoustic metamaterials have complex microstructures that are extremely difficult to fabricate.

Therefore, it would be desirable to have a method and apparatus that take into account at least some of the issues discussed above, as well as other possible issues. For example, it would be desirable to have a method and apparatus that overcome a technical problem with optimization and fabrication of acoustic metamaterials having specified dynamic material properties.

SUMMARY

According to one embodiment of the present invention, a method for fabricating an acoustic metamaterial includes determining at least one tuned physical property for each of a plurality of micro-resonators according to a desired acoustic property of the acoustic metamaterial. For a particular physical property, a value of the tuned physical property for at least one of the plurality of micro-resonators is different from a value of the tuned physical property for at least one other of the plurality of micro-resonators. The method also includes additively forming the acoustic metamaterial such that the acoustic metamaterial comprises a first structure and the plurality of micro-resonators embedded within the first structure. Forming the acoustic metamaterial is performed such that an actual physical property of each of the plurality of micro-resonators is equal to a corresponding tuned physical property for each of the plurality of micro-resonators.

According to another embodiment of the present invention, a method for fabricating an acoustic metamaterial includes optimizing material densities and/or stiffnesses for each of a plurality of micro-resonators for the acoustic metamaterial according to a desired acoustic property of the acoustic metamaterial to generate optimized resonator mass densities and/or stiffnesses for each of the plurality of micro-resonators. At least one of the optimized resonator mass densities and/or stiffnesses is different from at least one other of the optimized resonator mass densities and stiffnesses. The method also includes additively forming the acoustic metamaterial according to the optimized resonator mass densities and/or stiffnesses such that the acoustic metamaterial comprises the plurality of micro-resonators embedded in a first structure. An actual resonator mass density and/or stiffness of each of the plurality of micro-resonators is substantially equivalent to a corresponding one of the optimized resonator mass densities and/or stiffnesses such that a resultant acoustic metamaterial has the desired acoustic property.

According to another embodiment of the present invention, a system for fabricating an acoustic metamaterial includes computational optimization solution configured to determine a desired mass density and/or stiffness for each of a plurality of micro-resonators according to a desired acoustic property of the acoustic metamaterial, and/or desired global wave filtering behavior. For example, the objective function for this optimization problem could be the norm of the difference between the desired material response and the actual realized material response. The desired mass density and/or stiffness of at least one of the plurality of micro-resonators is different from the desired mass density and/or stiffness of at least one other of the plurality of micro-resonators. The system also includes an additive manufacturing printer configured to deposit materials in a layer-by-layer fashion to form the acoustic metamaterial. The acoustic metamaterial is formed such that the acoustic metamaterial includes a first structure and a plurality of micro-resonators embedded within the first structure. The depositing of the material is performed such that an actual mass density and/or stiffness of each of the plurality of micro-resonators is equal to the corresponding desired mass density and/or stiffness.

DETAILED DESCRIPTION

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive.

Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

For purposes of the description hereinafter, the terms "upper," "lower," "right," "left," "vertical," "horizontal," "top," "bottom," and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g. interface layer, may be present between the first element and the second element.

In this disclosure, when an element, such as a layer, region, or substrate is referred to as being "on" or "over" another element, the element can be directly on the other element or intervening elements can also be present. In contrast, when an element is referred to as being "directly on," "directly over," or "on and in direct contact with" another element, there are no intervening elements present, and the element is in contact with another element.

The processes, steps, and structures described below do not form a complete process flow for acoustic metamaterials. The disclosure can be practiced in conjunction with 3D printing techniques currently used in the art, and only so much of the commonly practiced process steps are included as necessary for an understanding of the different examples of the present disclosure. The Figures represent cross sections of a portion of a printed object during fabrication and are not drawn to scale, but instead are drawn so as to illustrate different illustrative features of the disclosure.

As used herein, the phrase "at least one of", when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B and ten of item C; four of item B and seven of item C; or other suitable combinations.

As used herein, the terms "optimize", "optimization", and "optimizing" do not necessarily mean that the result is the very best possible result, but rather merely mean that an optimized value is a value the produces a desired result, the desired result possibly being a range of acceptable values or within a specified bound, or optimization may merely mean an improvement or change in a quality as compared with an unoptimized value. In an aspect, "optimizing" means tuning a variable such that a resulting property is within a range of acceptable resulting properties.

Disclosed herein are systems and methods for fabricating acoustic metamaterials having acoustic resonators embedded therein, where each acoustic resonator has an acoustic resonator property, such as, for example, a mass density, stiffness, size, shape, and/or placement within the acoustic metamaterial, that has been substantially optimized or tuned such that the resulting acoustic metamaterial has desired acoustic properties specified during the acoustic resonator property tuning process. In an aspect, the resulting acoustic metamaterial is said to have desired acoustic properties specified during the acoustic resonator property tuning process if the acoustic properties of the acoustic metamaterial are within a range of acceptable acoustic properties. In an embodiment, the acoustic metamaterials are fabricated with an additive manufacturing machine such as, for example, a 3D printer. In an embodiment, each acoustic resonator is cylindrically shaped and is attached to the main portion or superstructure of the acoustic metamaterial via a connector that is usually thin, or enclosed in a continuous multiphase composite material. The space between the acoustic resonator and the rest of the acoustic material may be occupied by a vacuum, a gas, or another solid material. To achieve a mass density/stiffness in each acoustic resonator that corresponds to the optimized acoustic resonator mass density/stiffness, the acoustic resonators may be formed from a combination of two different materials each having a different mass density. The materials are combined in a ratio (e.g., a desired micro-resonator specific ratio or desired acoustic resonator specific ratio) such that the resulting mass density of the combination or mixture is equal to the optimized mass density for that particular acoustic resonator. For acoustic resonators whose optimized mass density is less than the mass density of the least dense material, the resonator is fabricated such that it includes voids or empty space within it to reduce the mass and thereby reduce the mass density. In an embodiment, the entire volume of the acoustic resonator is filled with a porous foam-like printed material in order to lower the mass density of the acoustic resonator to be lower than that of the lowest density resonator material. In an embodiment, in order to reduce the mass density of the acoustic resonator to below that of the lowest density resonator material, the acoustic resonator is ring shaped defining a hole in the middle that is devoid of solid material. In an embodiment, the ring shape is filled with a spanning mesh (mesh structure) to increase the stiffness of the acoustic resonator. In some applications, a ring shaped resonator without the spanning mesh may not be desirable since it may introduce additional resonances that may be unwanted. In an embodiment, the size of the resonators and the connectors are limited by the minimum feature size of the additive manufacturing machine.

An acoustic metamaterial is a dispersive multiphase composite material designed to produce dynamic material properties not found in nature, individual materials, or in traditional composite materials. For example, an acoustic metamaterial may have a negative effective dynamic moduli, a negative effective dynamic density, a negative acoustic refractive index, and/or an imaginary speed of sound associated with a local resonance. An acoustic metamaterial may have complex wave number(s) and/or purely imaginary wave number(s). Acoustic metamaterials may be used for wave bending, wave steering, and/or wave focusing. Acoustic metamaterials may be used to shield sensitive structural components by redirecting damaging shocks and vibrations or undesired frequencies. Acoustic metamaterials may also be used as acoustic insulation for internal noise damping. Additionally, acoustic metamaterials may be used for sub-wavelength imaging, focusing explosives, damage detection (NDE), and for communications.

Figure 1:
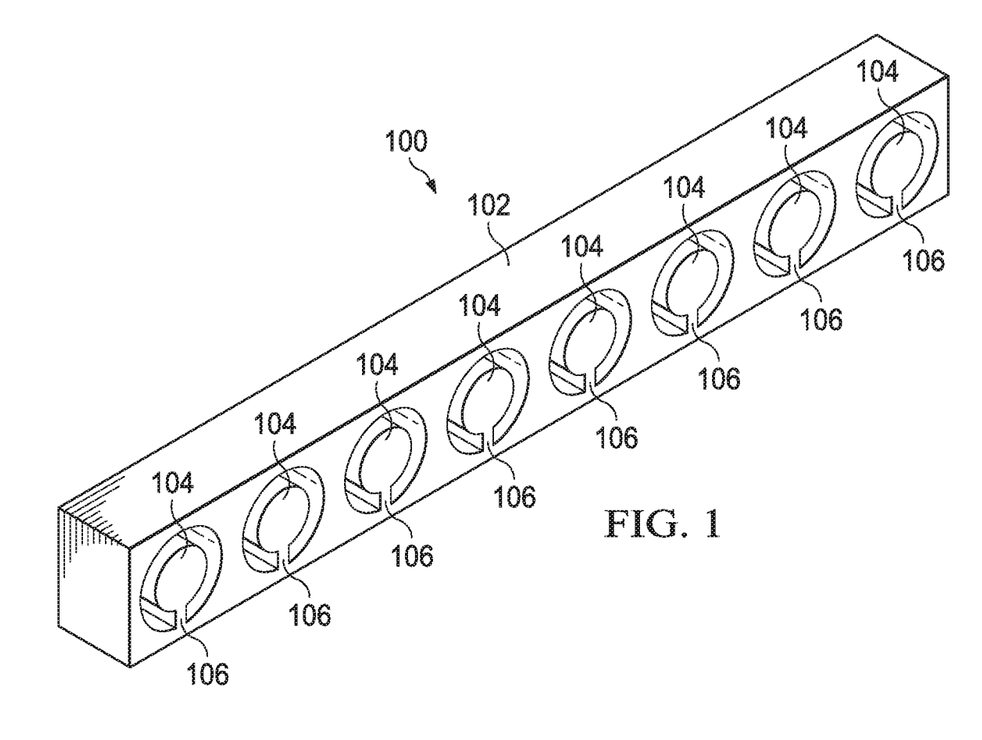
FIG. 1 is a perspective view of an acoustic metamaterial in accordance with an illustrative embodiment.

With reference now to the figures and, in particular, with reference to FIG. 1, a perspective view of an acoustic metamaterial 100 is depicted in accordance with an illustrative embodiment. Acoustic metamaterial 100 includes a superstructure 102 and a plurality of acoustic resonators 104 each connected to the superstructure 102 by a corresponding connector 106. In an embodiment, the mass density of each acoustic resonator 104 is optimized such that the acoustic metamaterial 100 has desired acoustic properties. Thus, in an embodiment, the mass densities of each of the acoustic resonators 104 may all be different, may all be the same, or some may be the same and some may be different. The acoustic resonators 104 may include a single material or a combination of two materials. The material of the acoustic resonators 104 may be different from the material from which the superstructure 102 is fabricated and may also be different from the material from which the connecters 106 are fabricated. The connectors 106 connect the acoustic resonators 104 to the superstructure such that the acoustic resonators 104 only physically touch to superstructure through the connectors 106, at least when the acoustic metamaterial is not subject to external vibrational energy. The connectors 106 may completely encapsulate the resonator, or may be relatively thin as compared to the acoustic resonators 104 and, in an embodiment, are only as thick as is necessary for structural support of the acoustic resonators 104.

Figure 2A:
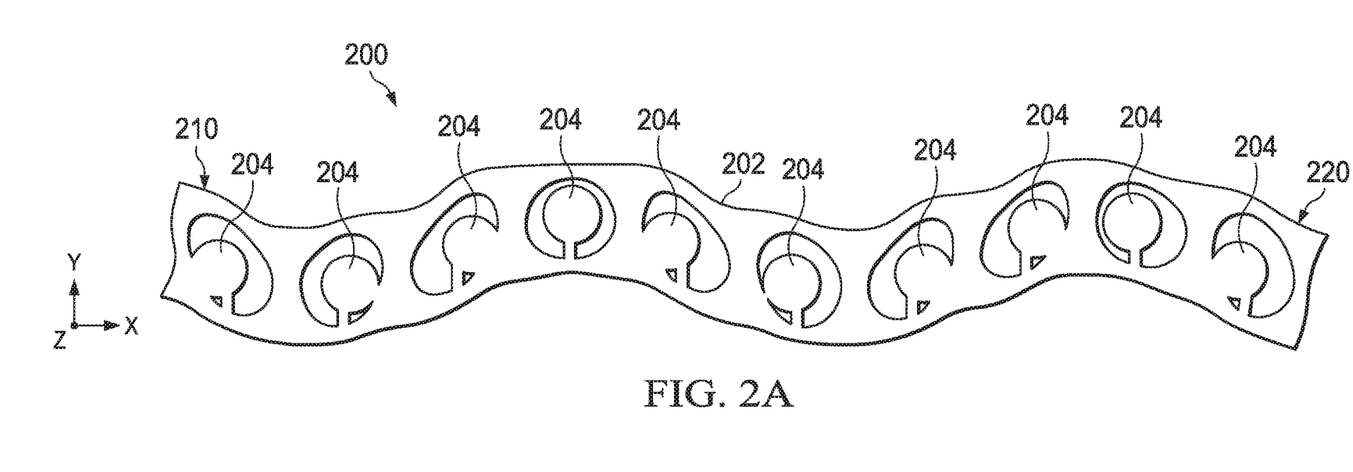
FIG. 2A is a diagram of a vibrating acoustic metamaterial at one instant of time, without any mass density/stiffness optimization.

FIG. 2A is a diagram of a vibrating acoustic metamaterial 200 at one instant of time. In FIG. 2A, the acoustic resonators 204 have not been optimized. Thus, a vibration at one end 210 results in the other end 220 of the acoustic metamaterial 200 vibrating.

Figure 2B:
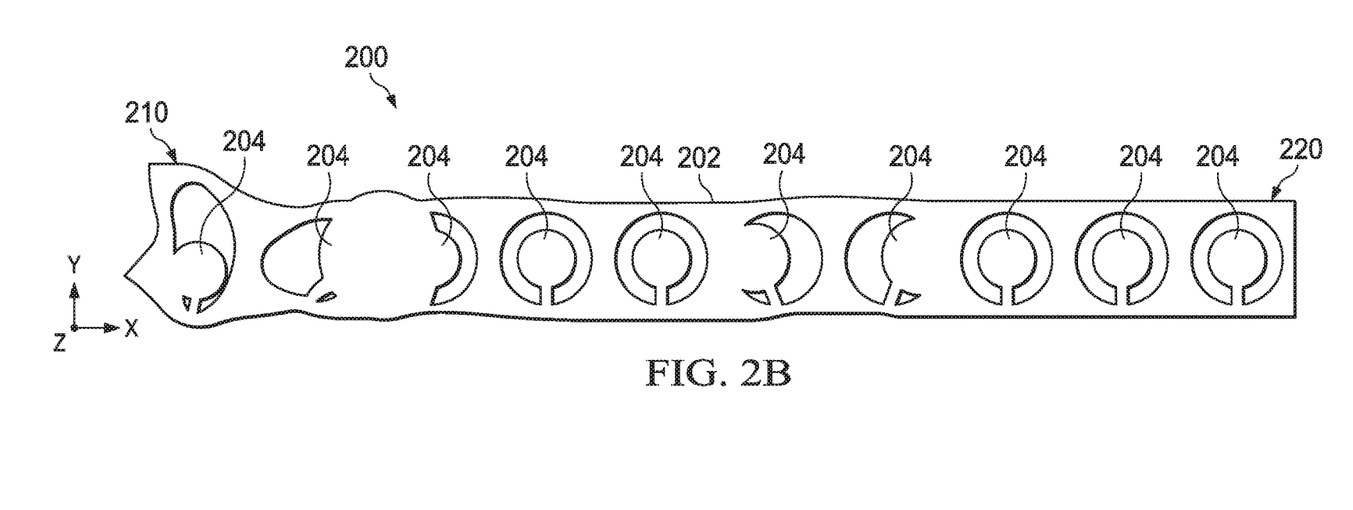
FIG. 2B is a diagram of a vibrating acoustic metamaterial at an instant of time after optimizing the mass density of the acoustic resonators in accordance with an illustrative embodiment (in this case with the objective function being vibration isolation at the right end of the structure)

FIG. 2B is a diagram of a vibrating acoustic metamaterial 200 at an instant of time after optimizing the mass density/stiffness of the acoustic resonators 204 in accordance with an illustrative embodiment. As seen in FIG. 2B, after the mass densities/stiffnesses of the acoustic resonators 204 have been optimized, vibrational energy has been minimized (or reduced) at end 220 of the acoustic metamaterial 200 such that a vibration at end 210 of the acoustic metamaterial 200 is not propagated to the other end 220 of the acoustic metamaterial 200.

Figure 3:
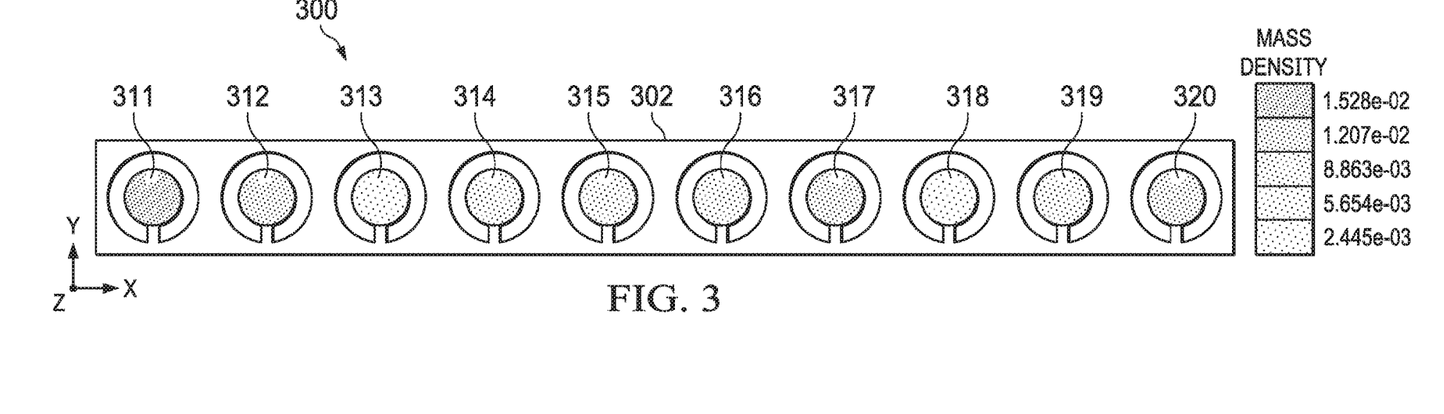
FIG. 3 is a diagram of an acoustic metamaterial with optimized acoustic resonators mass density in accordance with an illustrative embodiment.

FIG. 3 is a diagram of an acoustic metamaterial 300 with optimized acoustic resonators 311-320 in accordance with an illustrative embodiment. Acoustic metamaterial 300 includes a superstructure 302 with a plurality of acoustic resonators 311-320 embedded therein. The mass density and/or stiffness of each acoustic resonator 311-320 has been optimized such that the acoustic metamaterial has acoustic properties that are desirable for the intended use of the acoustic metamaterial 300. Different uses for the acoustic metamaterial 300 may require different desired acoustic properties. For example, an aircraft wing may need different acoustic properties from those of a material used to acoustically shield sensitive electronics. As depicted, the mass density of acoustic resonator 311 is the highest of the acoustic resonators 311-320. The mass density of resonators 313, 318 are the lowest of the acoustic resonators 311-320. The other acoustic resonators 312, 314-317, 319-320 have mass densities somewhere between those of acoustic resonator 311 and acoustic resonators 313, 318. The mass densities of acoustic resonators 314, 316, and 319 are the same. The mass densities of acoustic resonators 317 and 320 are the same.

In addition to optimizing the mass densities and/or stiffness of the acoustic resonators, in some embodiments, the mass densities and/or stiffness of the connectors, such as connectors 106 shown in FIG. 1 may also be optimized.

Figure 4:
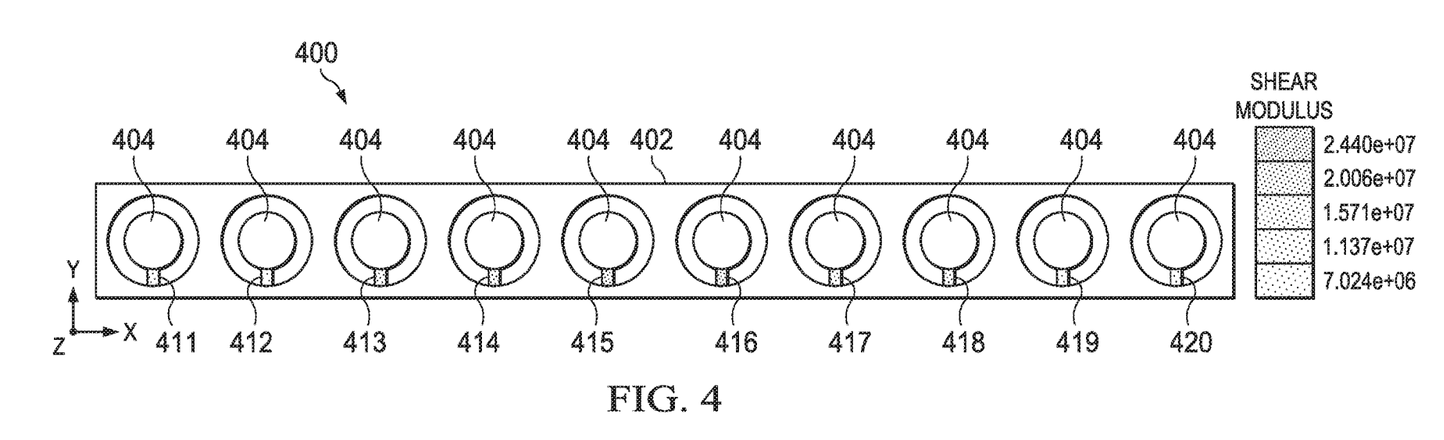
FIG. 4 is a diagram of an acoustic metamaterial with optimized stiffness of acoustic resonator connectors in accordance with an illustrative embodiment.

FIG. 4 is a diagram of an acoustic metamaterial 400 with optimized acoustic resonator connectors stiffnesses 411-420 in accordance with an illustrative embodiment. Acoustic metamaterial 400 includes a superstructure with acoustic resonators 404 embedded therein. The acoustic resonators 404 are connected to the superstructure 402 via the connectors 411-420. Each of the connecters 411-420 has been optimized such that the stiffness/thickness of each of the connectors 411-420 aids in causing the acoustic metamaterial 400 to have the desired acoustic properties for which it was optimized. The acoustic resonators 404 may also have been optimized. In the depicted example, connector 415 has the highest stiffness and connector 412 has the lowest stiffness. Connectors 411, 413-414, and 416-420 have varying stiffnesses somewhere between the stiffnesses of connector 412 and the mass density of connector 415.

Figure 5:
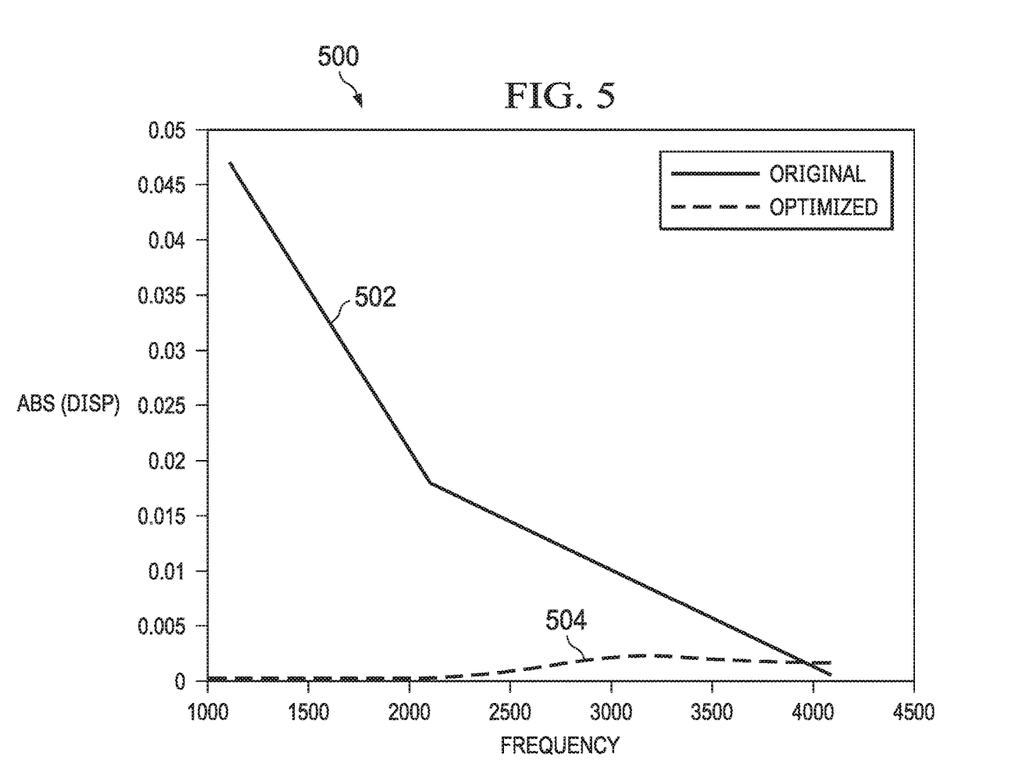
FIG. 5 shows graphs of minimized displacements at the right end of an acoustic metamaterial without optimized resonators and with optimized resonators.

FIG. 5 is a graph 500 of minimized displacements at the right end of an acoustic metamaterial, such as, for example, acoustic metamaterial 200 depicted in FIGS. 2A and 2B, without optimized resonators and with optimized resonators. Line 502 shows a plot of displacement of the right end of an acoustic metamaterial as a function of vibrational frequency applied to the left end of the acoustic metamaterial for an acoustic metamaterial without optimized acoustic resonators. Line 504 shows a plot of displacement of the right end of an acoustic metamaterial as a function of vibrational frequency applied to the left end of the acoustic metamaterial for an acoustic metamaterial with optimized acoustic resonators. As can be seen in graph 500, vibrational energy transmitted to the right end of the acoustic metamaterial is substantially reduced when the acoustic resonators' mass density/stiffness has been optimized.

Figure 6:
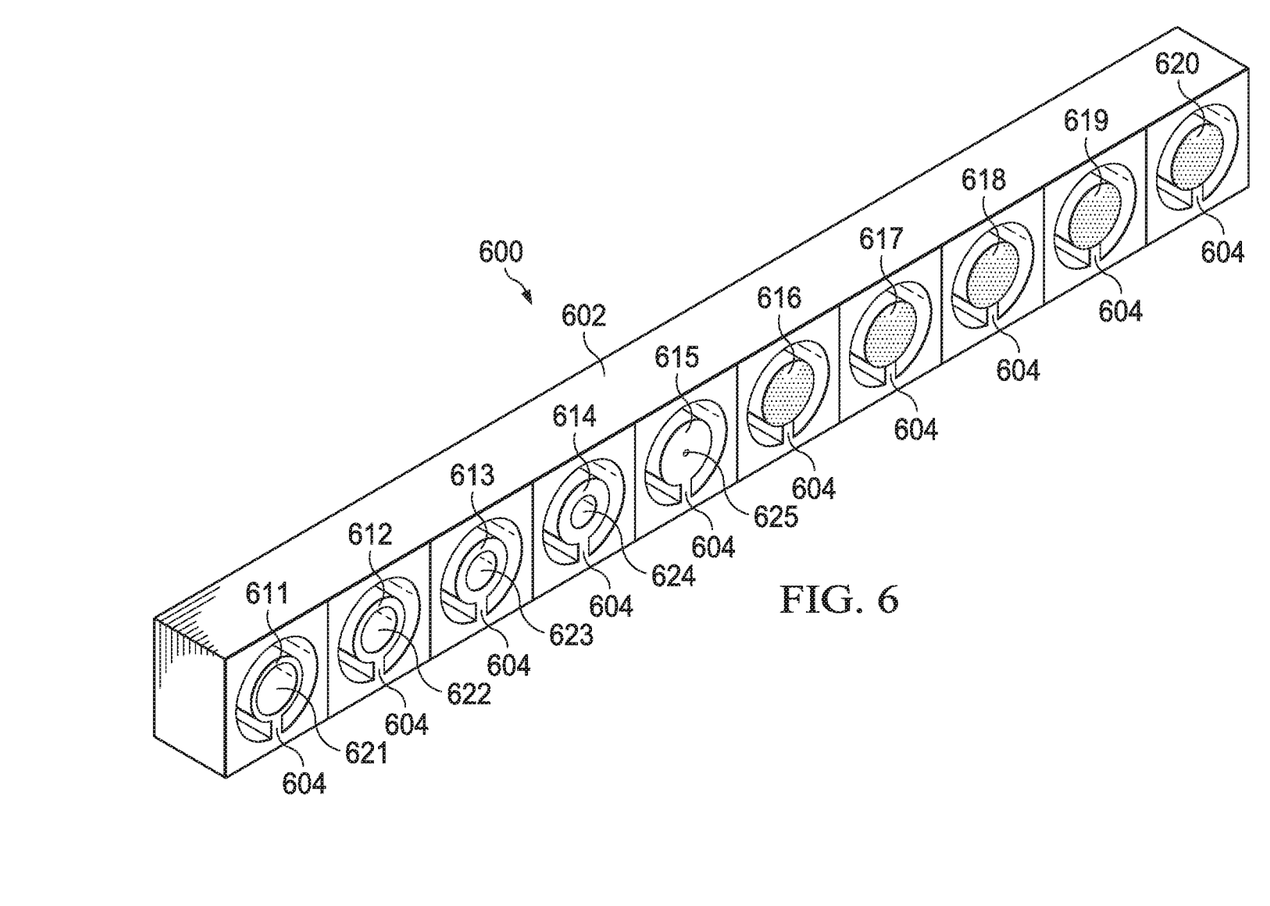
FIG. 6 is an acoustic metamaterial with acoustic resonators of varying mass densities in accordance with an illustrative embodiment.

Turning now to FIG. 6, an acoustic metamaterial 600 with acoustic resonators 611-620 of varying mass densities is depicted in accordance with an illustrative embodiment. Acoustic metamaterial 600 includes a superstructure 602 having a plurality of acoustic resonators 611-620 embedded therein and connected to the superstructure 602 by connectors 604. In an embodiment, the acoustic resonators 611-620 are fabricated from one or the other of two resonator material or of a combination of both resonator materials. The two resonator materials have different mass densities with one having a mass density that is significantly less than that of the other. For example, in an illustrative embodiment, one of the resonator materials is acrylonitrile butadiene styrene (ABS) and the other is tungsten (W). In other embodiments, other materials may be used. The resonator materials may be polymers, metals, ceramics, or any other material suitable for the intended purpose of the acoustic metamaterial. The superstructure 620 may be fabricated from one of the two resonator materials, from a combination of both resonator materials, or from another material different from either of the two resonator materials. The superstructure 620 may be, for example, metal, plastic, rubber, or ceramic. Similarly, the connectors 604 may be fabricated from one of the two resonator materials, from a combination of both resonator materials, or from another material different from either of the two resonator materials. The connector 604 may be fabricated from the same material as its corresponding acoustic resonator 611-620, from the same material as the superstructure 602, or from some other material that is different from both the material from which the acoustic resonators 611-620 are fabricated and the material from which the superstructure 602 is fabricated.

In order to have an acoustic resonator with a mass density lower than the mass density of the least dense resonator material, the acoustic resonator may be fabricated such that the acoustic resonator is not solid and fabricated from the least dense resonator material. For example, acoustic resonators 611-615 each have mass densities that are less than the mass density of the least dense resonator material. Additionally, in the depicted example, the mass density of each of acoustic resonators 611-615 is different. This is accomplished by varying the amount of resonator material that is used to form the acoustic resonator. For example, acoustic resonator 611 is a very thin ring of the least dense resonator material that defines a relatively large hole 621. Acoustic resonator 612 is a slightly thicker ring of the least dense resonator material than acoustic resonator 611 with a slightly smaller hole 622. Thus, acoustic resonator 612 has a mass density that is larger than that of acoustic resonator 611. Similarly, each of acoustic resonators 613-615 has a slightly thicker ring of the least dense resonator material and a slightly smaller hole 623-625 than the preceding acoustic resonator 613-615 to its left. Thus, each of the acoustic resonators 613-615 has a slightly higher mass density than the preceding acoustic resonator to its left.

Acoustic resonator 616 is fabricated solely from the least dense resonator material and is solid. Thus, this acoustic resonator 616 has the same mass density as the least dense resonator material. Acoustic resonator 620 is fabricated from the most dense resonator material. Thus, acoustic resonator 620 has the mass density of the most dense resonator material. Acoustic resonators 617-619 are fabricated from a combination of the two resonator materials. By varying the ratio of the combination of resonator materials, varying mass densities between the mass density of the least dense resonator material and the density of the densest resonator material may be achieved.

Although the acoustic metamaterials disclosed herein are shown as a linear array of acoustic resonators, it will be recognized that, in other embodiments, the acoustic metamaterial may include a two-dimensional array of acoustic resonators embedded in a superstructure or a three-dimensional array of acoustic resonators embedded in a superstructure. Thus, in some embodiments, some of the acoustic resonators in the final finished acoustic metamaterial are not exposed to a surface, but are buried within the bulk of the material.

Although described primarily as cylindrically shaped acoustic resonators, in other embodiments, the acoustic resonators may take on other shapes. For example, the acoustic resonators may be spherically shaped. Also, although depicted as uniformly shaped, sized, and spaced, in other embodiments, some acoustic resonators may be of a different shape and/or a different size from other acoustic resonators. In some embodiments, the distance between adjacent acoustic resonators may vary throughout the acoustic metamaterial.

Figure 7:
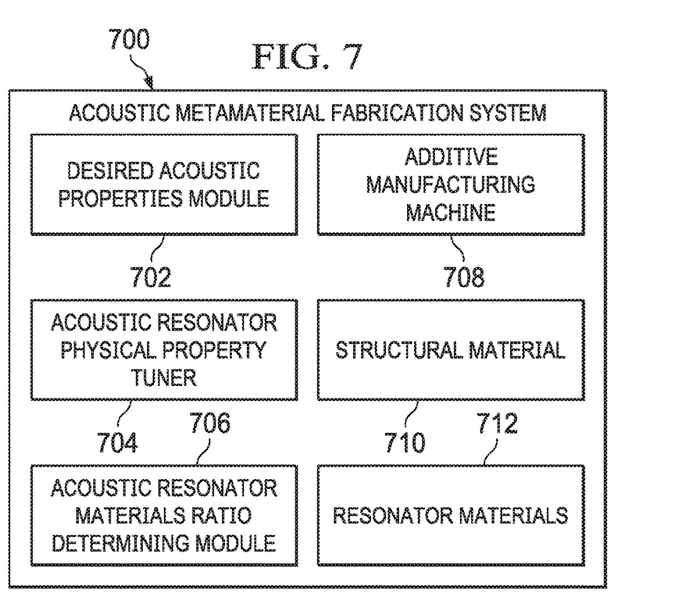
FIG. 7 is a diagram of an acoustic metamaterial fabrication system in accordance with an illustrative embodiment.

Turning now to systems and methods for fabricating the disclosed acoustic metamaterials, reference is now made to FIG. 7, which is a diagram of an acoustic metamaterial fabrication system 700 in accordance with an illustrative embodiment. The system 700 includes a desired acoustic properties module 702, an acoustic resonator physical property tuner 704, an acoustic resonator materials ratio determining module 706, an additive manufacturing machine 708, structural material 710, and resonator materials 712.

The desired acoustic properties module 702 includes one or more acoustic properties that are desired of the acoustic metamaterial to be constructed. Acoustic properties may include a desired level of acoustic or vibrational dampening, filtering of unwanted vibrational frequencies, acoustic insulation, acoustic insulation for internal noise damping, and sub-wavelength imaging. The acoustic properties may enable the acoustic metamaterial to be used for focusing explosives, damage detection (NDE), for facilitating communications, acoustically isolating a material or component, etc. The desired acoustic properties may be expressed in terms of global wave filtering, homogenized moduli, refractive index, speed of sound through the acoustic metamaterial or associated with a local resonance, and wave numbers. The density and refractive index may each be either positive or negative. The speed of sound may be either a real number, a purely imaginary number, or a complex number. The wave numbers may be real, complex, or purely imaginary.

The desired acoustic properties contained in the desired acoustic properties module 702 may be obtained from input from a user or from another process and may be stored in a data store such as a database.

The acoustic resonator physical property tuner 704 tunes or optimizes the one or more physical properties of each acoustic resonator. The physical properties may include the mass density, stiffness, size, shape, and/or location of each of a plurality of acoustic resonators that will be present in the acoustic metamaterial according to the desired acoustic properties obtained from module 702 such that the resulting acoustic metamaterial fabricated by the acoustic metamaterial fabrication system 700 will have the desired acoustic properties. In an embodiment, the acoustic resonator physical property tuner_704 also optimizes the mass densities/stiffnesses, or other physical properties, such as size, shape, and location, of the connectors that connect the resonators to the superstructure. In an embodiment, the acoustic resonator physical property tuner 704 tunes or optimizes the size, shape, and/or placement of the resonators. In an embodiment, computational optimization or tuning is used to determine a desired mass density/stiffness for each of a plurality of micro-resonators according to a desired acoustic property of the acoustic metamaterial, and/or desired global wave filtering behavior. In an embodiment, the desired acoustic property may be at least one of a negative modulus, a negative density, a negative refractive index, an imaginary speed of sound, a complex wave number, and a purely imaginary wave number. In an embodiment, the desired acoustic property of the acoustic metamaterial may be at least one of no vibrational wave propagation, acoustic dampening, structural isolation, and acoustic cloaking.

The objective function for this optimization problem is the norm of the difference between the desired material response and the actual realized material response. Additional details on the optimization may be found in "Large Scale Parameter Estimation Problems in Frequency-Domain Elastodynamics Using an Error in Constitutive Equation Functional" by Banerjee, et al., Comput. Methods Appl. Mech. Engrg. 253 (2013) 60-72, which is incorporated herein by reference. A copy of this reference may be obtained at https://pdfs.semanticscholar.org/5bc5/dc504565681ffe42cddef e3f9f10c3a4ed0f.pdf.

Figure 8:
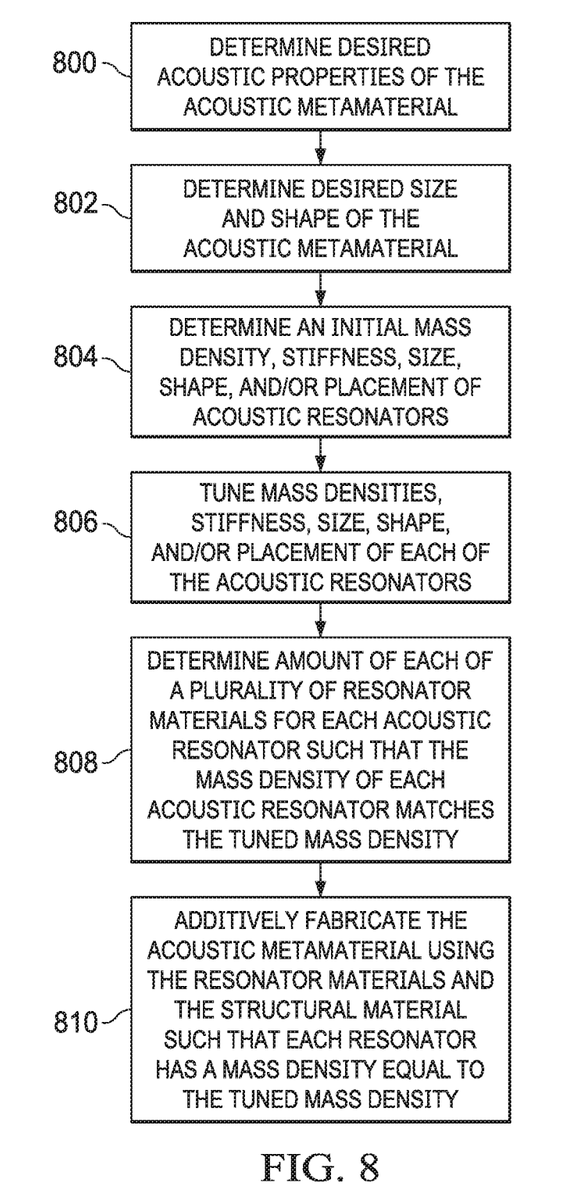
FIG. 8 is a flowchart of a process for fabricating an acoustic metamaterial depicted in accordance with an illustrative embodiment.

Turning next to FIG. 8, a flowchart of a process for fabricating an acoustic metamaterial is depicted in accordance with an illustrative embodiment.

The process begins by determining desired acoustic properties of the acoustic metamaterial to be fabricated (step 800). The desired acoustic properties may be determined based on input values received from a user or from another process. The desired acoustic properties may be, for example, wave bending parameters, wave steering parameters, wave focusing parameters, boundary conditions (e.g., one end of the metamaterial should remain stationary even while the other end is subjected to vibrational forces or displacement), acoustic damping, selectively damping specified frequencies, etc. The desired acoustic properties may include specification of a moduli, a density, a refractive index, and/or a speed of sound associated with a local resonance. In some embodiments, the desired acoustic properties may include negative moduli, negative density, a negative refractive index, and/or an imaginary or complex speed of sound. Exotic parameters such as negative moduli, negative density, a negative refractive index, and/or an imaginary or complex speed of sound may provide the acoustic metamaterial with unusual acoustic properties that do not occur in nature. Next, the desired size of the acoustic metamaterial is determined (step 802). The size of the acoustic metamaterial may be determined according to its purpose. For example, the size of an acoustic metamaterial that is to be incorporated into an aircraft wing may be drastically different from the size of an acoustic metamaterial that is to be incorporated into an accelerometer.

Next, an initial mass density, stiffness, size, shape, and/or placement of the acoustic resonators is determined (step 804). In some embodiments, the size and/or shape of each acoustic resonator is identical. In other embodiments, the size and shape of the acoustic resonators may differ. In some embodiments, the acoustic resonators are uniformly spaced apart. In other embodiments, the acoustic resonators are arranged in some other fashion such that the distance between two adjacent resonators is different from the distance between two other adjacent resonators. In some embodiments, if all of the mass density, stiffness, size, shape, and placement are to be optimized or tuned, step 804 may be omitted.

Next, the mass density, stiffness, size, shape, and/or locations of each of the acoustic resonators is tune (or substantially optimized) according to the desired acoustic properties of the acoustic metamaterial to be fabricated such that the desired acoustic properties of the acoustic metamaterial are realized (step 806). Mass density, stiffness, size, shape, and locations are examples of physical properties of the acoustic resonator. In other embodiments, additional physical properties of the acoustic resonator may be tuned in addition to or in place of these physical properties listed above. The tuning may take into account the type of material that the acoustic resonators will be incorporated within, the size and shape of the desired acoustic metamaterial, and the types of materials incorporated into the acoustic resonators. Other parameters may also be included in the tuning process. If the size, shape, and/or placement of the acoustic resonators are not to be uniform, these parameters may also be optimized by the optimization process. Thus, in some embodiments, the determining process of step 804 is incorporated into the optimization process of step 806. Additionally, in some embodiments, the acoustic resonators are substantially cylindrical and are connected to a main superstructure via a thin connector. Furthermore, in some embodiments, the thickness and/or mass density of the connectors are also optimized to produce the desired acoustic properties in the acoustic metamaterial. In an embodiment, the minimum size of the acoustic resonators, the connector, and the superstructure are limited by the minimum feature size of the additive manufacturing machine.

Once the physical properties, such as mass density, stiffness, size, shape, and location of each of the acoustic resonators is determined, the amount of each of a plurality of resonator materials for each acoustic resonator is determined such that the mass density of each acoustic resonator matches the corresponding tuned or determined mass density (step 808). In an embodiment, two resonator materials are used. A first resonator material has a relatively low mass density and the second resonator material has a relatively high mass density, at least as compared to the first resonator material. Next, the process additively fabricates the acoustic metamaterial using the resonator materials in the determined ratios for each acoustic resonator and the superstructure material such that each acoustic resonator has a mass density equal to the tuned mass density for that acoustic resonator (step 810).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware. Some steps of the process may be implemented by an additive manufacturing machine such as, for example, a 3D printer.

In some alternative implementations of an illustrative embodiment, the function or functions noted in the blocks may occur out of the order noted in the figure. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, illustrative embodiments of the present invention provide a method and system for fabricating an acoustic metamaterial with desired acoustic properties. In an embodiment, the acoustic metamaterial is fabricated with acoustic resonators of varying mass densities/stiffnesses that have been optimized to produce desirable acoustic properties. In an embodiment, the process begins by determining a desired mass density/stiffness for each of a plurality of micro-resonators according to a desired acoustic property of the acoustic metamaterial. The desired mass density/stiffness of at least one of the plurality of micro-resonators is different from the desired mass density/stiffness of at least one other of the plurality of micro-resonators. The process continues by depositing materials in a layer-by-layer fashion to form the acoustic metamaterial. The acoustic metamaterial is formed such that the acoustic metamaterial includes a first structure and the plurality of micro-resonators which are embedded within the first structure. In an embodiment, the acoustic resonators are attached to the first structure by a thin connector such that the resonators do not touch the first structure in any other place, but through the thin connector. The thin connector may be fabricated from the same materials as the resonator, from the same materials as the first structure, or from materials that are different from either the resonator materials or the first structure materials. In an embodiment, the mass density and/or the size and/or the shape of the thin connector is also optimized for desired acoustic properties. The depositing of the materials is performed such that at least one of an actual mass density, actual stiffness, actual size, actual shape, and an actual location of each of the plurality of micro-resonators is equal to a corresponding desired mass density, desired stiffness, desired size, desired shape, and actual location.

The process utilized to create the structure, results in acoustic metamaterial with acoustic properties not found naturally. The process utilized to create the acoustic metamaterials also produces acoustic metamaterials that may be tailored for the use contemplated.

The methods and structures that have been described above with reference to figures in the different examples may be employed in any number of applications. For example, the acoustic metamaterials fabricated according to the disclosed methods and systems may be used to shield sensitive electronics, accelerometers, and data recorders by redirecting damaging shocks and vibrations or undesired frequencies. Acoustic metamaterials fabricated according to the disclosed methods and systems may also be used as acoustic insulation for internal noise damping. Additionally, acoustic metamaterials fabricated according to the disclosed methods and systems may be used for sub-wavelength imaging, damage detection (NDE), and for communications.

Figure 9:
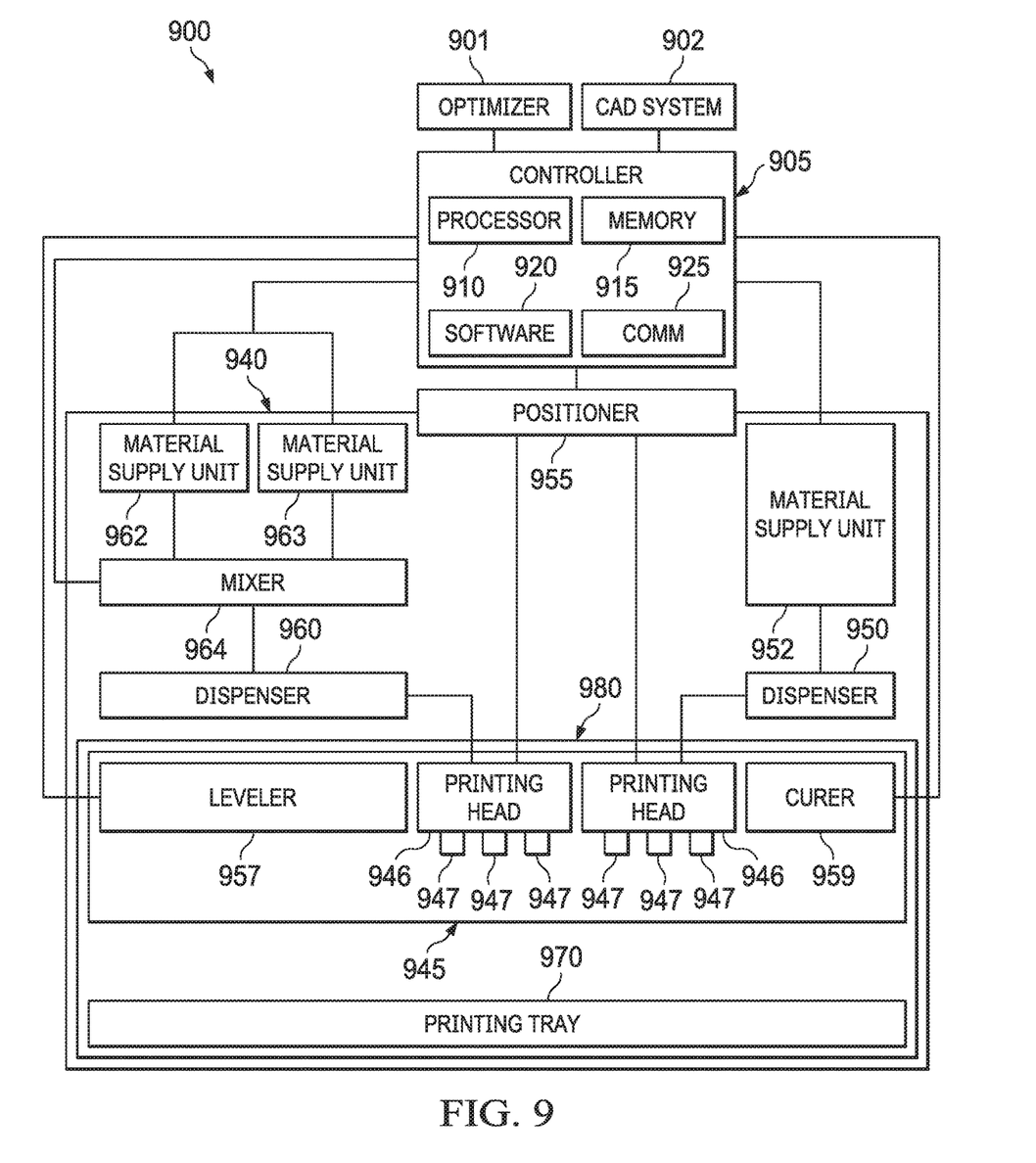
FIG. 9 is a block diagram of a 3D printer system depicted in accordance with an illustrative embodiment.

FIG. 9 is a block diagram of a 3D printer system 900 depicted in accordance with an illustrative embodiment. 3D printer system 900 may implement the methods disclosed herein, such as, method 800. 3D printer system 900 may also implement acoustic metamaterial fabrication system 700. 3D printer system 900 may include, for example, an optimizer 901, a CAD system 902 or other design module, controller 905, and printing apparatus 940.

The optimizer 901 determines a desired mass density/stiffness for each of a plurality of resonators that are to be fabricated within a superstructure where an acoustic metamaterial includes the superstructure with resonators embedded therein. The desired mass density/stiffness is determined such that the fabricated acoustic metamaterial has desired acoustic properties. The desired acoustic properties may be determined based on the function and use for which the acoustic metamaterial is being fabricated.

Controller 905, which may prepare the digital data that characterizes a 3-D object for printing, and control the operation of the printing apparatus, may include, for example, a processor 910, a memory unit 915, software code 920, and a communications unit 925. Other configurations may be used for a controller or control unit. Control functionality may be spread across units, and not all control functionality may be within system 900. For example, a separate unit, such as a personal computer or workstation, or a processing unit within a supply source such as a cartridge may provide some control or data storage capability. Communications unit 925 may, for example, enable transfer of data and instructions between controller 905 and optimizer 901 and/or CAD system 902, between controller 905 and printing apparatus 940, and/or between controller 905 and other system elements. Controller 905 may be suitably coupled and/or connected to various components of printing apparatus 940.

Printing apparatus 940 may include for example positioner(s) 955, material dispenser(s) 950, 960, material supply unit(s) 952, 962, 963, mixer 964, and printing sub-system 980. Printing sub-system 980 may include a printing box 945, and a printing tray 970. Printing box 945 may include printing head(s) 946, printing nozzle(s) 947, leveler(s) 957, curer(s) 959, and other suitable components. Positioner 955, or other suitable movement devices, may control the movement of printing head 945. Leveler or leveling device 957 may include, for example, a roller or blade or other suitable leveling mechanism. Printing head 945 may be, for example, an ink jet head or other suitable printing head.

Controller 905 may utilize Computer Object Data (COD) representing an object or a model, for example, CAD data in STL format. Controller 905 may also utilize optimized data from optimizer 901. Other data types or formats may be used. Controller 905 may convert such data to instructions for the various units within 3D printer system 900 to print a 3D object. Controller 905 may be located inside printing apparatus 940 or outside of printing apparatus 940. Controller 905 may be located outside of printing system 900 and may communicate with printing system 900, for example, over a wire and/or using wireless communications. In some embodiments, controller 905 may include a CAD system or other suitable design system. In alternate embodiments, controller 905 may be partially external to 3D printer system 900. For example, an external control or processing unit (e.g., a personal computer, workstation, computing platform, or other processing device) may provide some or all of the printing system control capability.

In some embodiments, a printing file or other collection of print data may be prepared and/or provided and/or programmed, for example, by a computing platform connected to 3D printer system 900. The printing file may be used to determine, for example, the order and configuration of deposition of building material via, for example, movement of and activation and/or non-activation of one or more nozzles 947 of printing head 945, according to the 3D object to be built.

Controller 905 may be implemented using any suitable combination of hardware and/or software. In some embodiments, controller 905 may include, for example, a processor 910, a memory 915, and software or operating instructions 920. Processor 910 may include conventional devices, such as a Central Processing Unit (CPU), a microprocessor, a "computer on a chip", a micro controller, etc. Memory 915 may include conventional devices such as Random Access Memory (RAM), Read-Only Memory (ROM), or other storage devices, and may include mass storage, such as a CD-ROM or a hard disk. Controller 905 may be included within, or may include, a computing device such as a personal computer, a desktop computer, a mobile computer, a laptop computer, a server computer, or workstation (and thus part or all of the functionality of controller 905 may be external to 3D printer system 900). Controller 905 may be of other configurations, and may include other suitable components.

According to some embodiments of the present invention, material supply unit(s) 952, 962, 963 may supply building materials to printing apparatus 940. Building materials may include any suitable kind of object building material, such as, for example, photopolymers, wax, powders, plastics, metals, and may include modeling material, support material and/or release material, or any alternative material types or combinations of material types. In some embodiments of the present invention, the building materials used for construction of the 3D object are in a liquid form. In an exemplary embodiment, the modeling and/or support materials used are photopolymers that may contain material curable by electromagnetic radiation and/or electron beams etc. The materials may come in different forms, textures, colors, etc. Other suitable materials or combinations of materials may be used.

In an embodiment, material supply unit 962 contains a first relatively low mass density material and material supply unit 963 contains a second relatively high mass density material. The mass density of the first relatively low mass density material is less dense (often much less) than the second relatively high mass density material. In an embodiment, the first relatively low mass density material is ABS and the second relatively high mass density material is tungsten (W). The mixer 964 mixes ratios for the first relatively low mass density material and the second relatively high mass density material in a ratio determined by the optimizer 901 or the controller 905 such that a corresponding resonator has the mass density specified by the optimizer. Depending on the mass density specified, the mixer may only use only first relatively low mass density material, only the second relatively high mass density material, or various ratios combining the two. In an embodiment, for resonators that are desired to have a mass density lower than the mass density of the first relatively low mass density material, the resonator is fabricated to be of a ring shape from the first relatively low mass density material such that the resonator has a hole in the middle rather than being a solid cylindrical mass.

Figure 10:
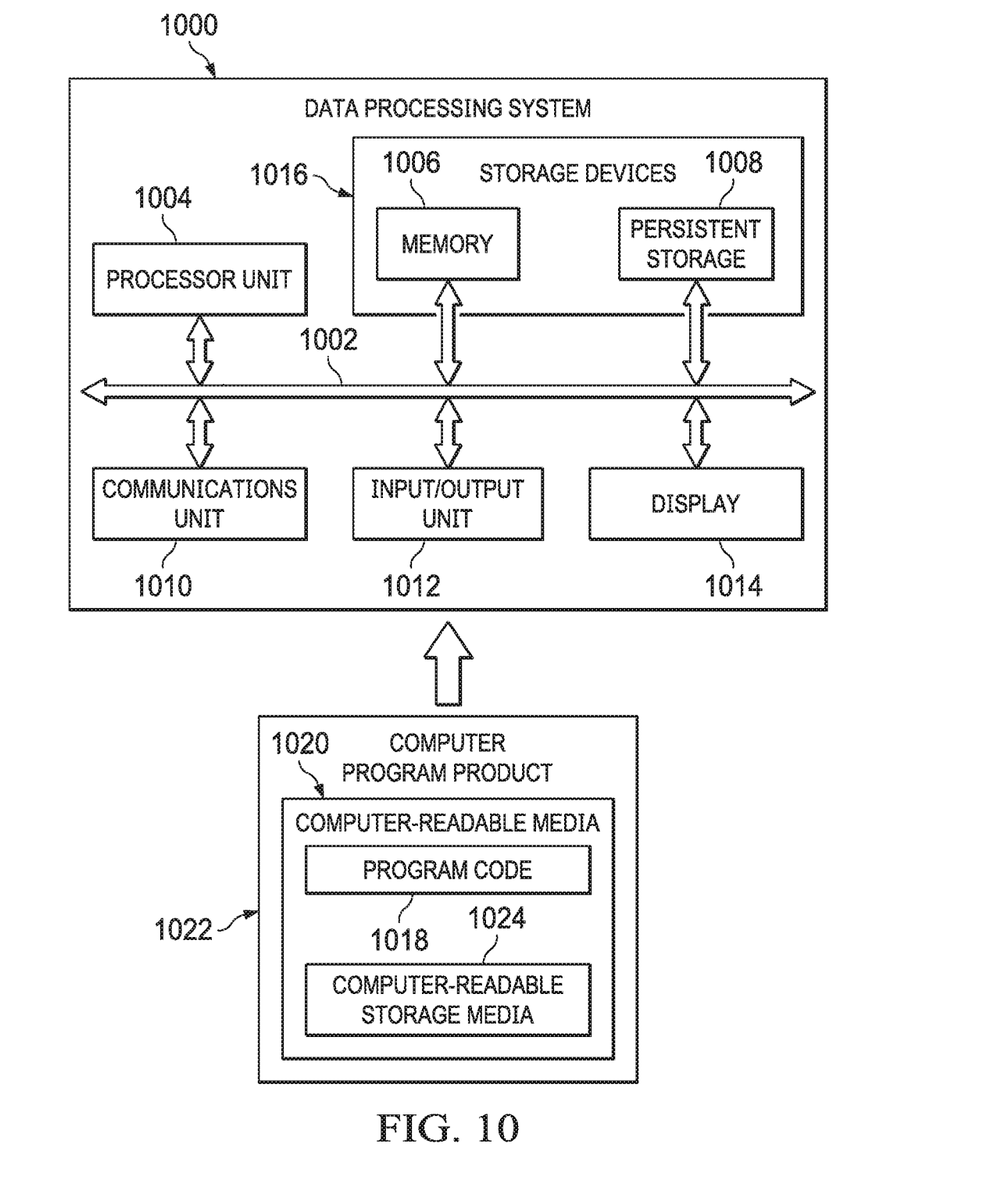
FIG. 10 is a block diagram of a data processing system depicted in accordance with an illustrative embodiment.

Turning now to FIG. 10, a block diagram of a data processing system is depicted in accordance with an illustrative embodiment. Data processing system 1000 may be used to implement (mass density optimizer) acoustic resonator physical property tuner 704 or acoustic resonator materials ratio determining module 706. Data processing system 1000 may also be used to implement optimizer 901, CAD 902, and/or controller 905. In an embodiment, data processing system 1000 is a massively parallel processing (MPP)data processor with multiple processors.

In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a solid-state drive (SSD), a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 may be transferred to data processing system 1000 using a computer-readable signal media. The computer-readable signal media may be, for example, a propagated data signal containing program code 1018. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for fabricating an acoustic metamaterial, the method comprising:
   determining at least one tuned physical property for each of a plurality of micro-resonators according to a desired acoustic property of the acoustic metamaterial comprising iteratively tuning the at least one tuned physical property for each of the plurality of micro-resonators, wherein for a particular physical property, a value of the tuned physical property for at least one of the plurality of micro-resonators is different from a value of the tuned physical property for at least one other of the plurality of micro-resonators; and
   additively forming the acoustic metamaterial such that the acoustic metamaterial comprises a first structure and the plurality of micro-resonators embedded within the first structure, the additively forming performed such that an actual physical property of each of the plurality of micro-resonators is equal to a corresponding tuned physical property for each of the plurality of micro-resonators,
   wherein the tuned physical property comprises a mass density and
   wherein the additively forming the acoustic metamaterial comprises mixing a first material and a second material in a determined ratio to produce a third material with a third material mass density equal to a tuned mass density for a corresponding one of the plurality of micro-resonators, the first material comprising a first mass density, the second material comprising a second mass density different from the first mass density.

2. The method of claim 1, wherein the tuned physical property further comprises one or more of a stiffness, a size, a shape, and a location.

3. The method of claim 1, wherein the additively forming the acoustic metamaterial comprises forming a low mass density acoustic resonator from at least one of the first and second materials such that the low mass density acoustic resonator contains voids within the low mass density acoustic resonator such that the mass density of the low mass density acoustic resonator is less than a mass density of the first material.

4. The method of claim 3, wherein the low mass density acoustic resonator comprises a porous foam like structure.

5. The method of claim 3, wherein low mass density acoustic resonator comprises a ring of at least one of the first material and the second material, the ring defining a hole devoid of solid material, the combination of the ring and the hole providing a micro-resonator having a micro-resonator density equivalent to a corresponding desired mass density.

6. The method of claim 5, wherein the low mass density acoustic resonator further comprises a mesh structure within the hole.

7. The method of claim 3, wherein the voids comprise one of a gas, a vacuum, or another solid material.

8. The method of claim 1, wherein the first material comprises tungsten (W) and the second material comprises a polymer.

9. The method of claim 8, wherein the polymer comprises acrylonitrile butadiene styrene (ABS).

10. The method of claim 1, wherein the desired acoustic property of the acoustic metamaterial comprises at least one of a negative modulus, a negative density, a negative refractive index, an imaginary speed of sound, a complex wave number, and a purely imaginary wave number.

11. The method of claim 1, wherein the desired acoustic property of the acoustic metamaterial comprises at least one of no vibrational wave propagation, acoustic dampening, structural isolation, and acoustic cloaking.

12. A method for fabricating an acoustic metamaterial, the method comprising:
   determining at least one tuned physical property for each of a plurality of micro-resonators according to a desired acoustic property of the acoustic metamaterial comprising iteratively tuning the at least one tuned physical property for each of the plurality of micro-resonators, wherein for a particular physical property, a value of the tuned physical property for at least one of the plurality of micro-resonators is different from a value of the tuned physical property for at least one other of the plurality of micro-resonators; and
   additively forming the acoustic metamaterial comprising 3D printing such that the acoustic metamaterial comprises a first structure and the plurality of micro-resonators embedded within the first structure, the additively forming performed such that an actual physical property of each of the plurality of micro-resonators is equal to a corresponding tuned physical property for each of the plurality of micro-resonators,
   wherein the tuned physical property comprises a mass density and
   wherein the additively forming the acoustic metamaterial comprises mixing a first material and a second material in a determined ratio to produce a third material with a third material mass density equal to a tuned mass density for a corresponding one of the plurality of micro-resonators, the first material comprising a first mass density, the second material comprising a second mass density different from the first mass density.

13. The method of claim 12, wherein the tuned physical property further comprises one or more of a stiffness, a size, a shape, and a location.

14. The method of claim 12, wherein the additively forming the acoustic metamaterial comprises forming a low mass density acoustic resonator from at least one of the first and second materials such that the low mass density acoustic resonator contains voids within the low mass density acoustic resonator such that the mass density of the low mass density acoustic resonator is less than a mass density of the first material.

15. The method of claim 14, wherein the low mass density acoustic resonator comprises a porous foam like structure.

16. The method of claim 14, wherein low mass density acoustic resonator comprises a ring of at least one of the first material and the second material, the ring defining a hole devoid of solid material, the combination of the ring and the hole providing a micro-resonator having a micro-resonator density equivalent to a corresponding desired mass density.

17. The method of claim 16, wherein the low mass density acoustic resonator further comprises a mesh structure within the hole.

18. The method of claim 14, wherein the voids comprise one of a gas, a vacuum, or another solid material.

19. The method of claim 12, wherein the desired acoustic property of the acoustic metamaterial comprises at least one of a negative modulus, a negative density, a negative refractive index, an imaginary speed of sound, a complex wave number, and a purely imaginary wave number.

20. The method of claim 12, wherein the desired acoustic property of the acoustic metamaterial comprises at least one of no vibrational wave propagation, acoustic dampening, structural isolation, and acoustic cloaking.

\* \* \* \* \*